(12) United States Patent
Chen

(10) Patent No.: US 11,572,945 B2
(45) Date of Patent: Feb. 7, 2023

(54) ALL-TERRAIN VEHICLE AND STARTING PROTECTOR FOR ALL-TERRAIN VEHICLE

(71) Applicant: SEGWAY TECHNOLOGY CO., LTD., Jiangsu (CN)

(72) Inventor: Shangjian Chen, Jiangsu (CN)

(73) Assignee: Segway Technology Co., Ltd., Jiangsu (CN)

( * ) Notice: Subject to any disclaimer, the term of this patent is extended or adjusted under 35 U.S.C. 154(b) by 27 days.

(21) Appl. No.: 17/318,007

(22) Filed: May 12, 2021

(65) Prior Publication Data
US 2021/0356036 A1    Nov. 18, 2021

(30) Foreign Application Priority Data
May 12, 2020   (CN) .......................... 202020783430.6

(51) Int. Cl.
*F16H 57/12* (2006.01)
*F16H 57/00* (2012.01)

(52) U.S. Cl.
CPC ......... *F16H 57/12* (2013.01); *F16H 57/0006* (2013.01); *F16H 2057/127* (2013.01)

(58) Field of Classification Search
CPC ................ F16H 57/12; F16H 57/0006; F16H 2057/127; F16D 7/025; B60Y 2200/124; B60Y 2400/4242; B60Y 2400/46; B60Y 2400/47
See application file for complete search history.

(56) References Cited

U.S. PATENT DOCUMENTS

| | | | |
|---|---|---|---|
| 7,549,493 B1* | 6/2009 | Jones | F02B 39/04 180/219 |
| 8,789,521 B2* | 7/2014 | Jonsson | B28D 1/045 125/13.01 |
| 10,473,082 B2* | 11/2019 | Nishida | F02N 11/0851 |

FOREIGN PATENT DOCUMENTS

| | | |
|---|---|---|
| CN | 102481644 A | 5/2012 |
| CN | 209145754 U | 7/2019 |
| EP | 2473305 A1 | 7/2012 |

OTHER PUBLICATIONS

European Patent Office, Search Report for EP application 21173610.3, dated Oct. 14, 2021.
Canadian Intellectual Property Office, Office Action for CA application 3,118,119, dated Sep. 9, 2022.

* cited by examiner

*Primary Examiner* — Victor L MacArthur
(74) *Attorney, Agent, or Firm* — Timothy W. Menasco, Esq.; Harter Secrest & Emery LLP

(57) ABSTRACT

A starting protector for an all-terrain vehicle is provided and includes a shaft, a driven wheel fitted over the shaft and comprising a tooth portion, a sleeving portion and a locking portion, and the tooth portion being configured to be connected with an engine; a driving wheel fitted over the sleeving portion, one side of the driving wheel being attached to the tooth portion, and the driving wheel being configured to be connected with a starting motor; a friction piece fitted over the sleeving portion and being in synchronous rotation with the sleeving portion, the friction piece being attached to the other side of the driving wheel, and when starting torque of the engine exceeds a preset value, the driving wheel and the friction piece slipping relatively; and a compressing assembly fitted over the sleeving portion (Continued)

and the locking portion to compress the friction piece and the driving wheel.

19 Claims, 4 Drawing Sheets

ALL-TERRAIN VEHICLE AND STARTING PROTECTOR FOR ALL-TERRAIN VEHICLE

CROSS-REFERENCE TO RELATED APPLICATIONS

This application is based upon and claims priority to Chinese Patent Application Serial No. 202020783430.6, filed on May 12, 2020, the entire content of which is incorporated herein by reference.

TECHNICAL FIELD

The present disclosure relates to a technical field of all-terrain vehicles, and more particularly to an all-terrain vehicle and a starting protector for the all-terrain vehicle.

BACKGROUND

At present, most of large-displacement engines for all-terrain vehicles all have a starting protection system, to avoid situation that when an overrunning clutch fails or an engine rotates reversely, a starting motor is driven through starting transmission. Since a transmission system is large in a speed ratio, driving the starting motor by reverse rotation of the engine leads to extremely high torque and rotating speed of the starting motor, and thus the motor is possibly damaged.

In a related art, a torque protector is generally complex in structure, and torque cannot be steplessly adjusted. In a hybrid engine, usually the starting motor drives the engine to start and an electric generator to rotate through starting a transmission system, which on the other hand, may cause problems of large starting torque and resistance.

SUMMARY

The present disclosure aims to at least solve one of technical problems existing in the prior art. To this end, one purpose of the present disclosure is to propose a starting protector for an all-terrain vehicle. The starting protector for the all-terrain vehicle enables a driving wheel to drive a driven wheel to rotate, which may avoid a starting motor from being damaged.

The starting protector for the all-terrain vehicle according to the present disclosure a shaft, a driven wheel fitted over the shaft and including a tooth portion, a sleeving portion and a locking portion, and the tooth portion being configured to be connected with an engine; a driving wheel fitted over the sleeving portion, one side of the driving wheel being attached to the tooth portion, and the driving wheel being configured to be connected with a starting motor; a friction piece fitted over the sleeving portion and being in synchronous rotation with the sleeving portion, the friction piece being attached to the other side of the driving wheel, and when starting torque of the engine exceeds a preset value, the driving wheel and the friction piece slipping relatively; and a compressing assembly fitted over the sleeving portion and the locking portion to compress the friction piece and the driving wheel.

An all-terrain vehicle according to the present disclosure, including: a starting motor an engine, wherein the engine includes a crankshaft; and a starting protector for the all-terrain vehicle including: a shaft, a driven wheel fitted over the shaft and comprising a tooth portion, a sleeving portion and a locking portion, and the tooth portion being configured to be connected with an engine; a driving wheel fitted over the sleeving portion, one side of the driving wheel being attached to the tooth portion, and the driving wheel being configured to be connected with a starting motor; a friction piece fitted over the sleeving portion and being in synchronous rotation with the sleeving portion, the friction piece being attached to the other side of the driving wheel, and when starting torque of the engine exceeds a preset value, the driving wheel and the friction piece slipping relatively; and a compressing assembly fitted over the sleeving portion and the locking portion to compress the friction piece and the driving wheel; the starting protector is arranged between the starting motor and the engine, the driven wheel is in transmission with the crankshaft, and the driving wheel is in transmission with the starting motor.

Additional aspects and advantages of the present disclosure will be partly given in the following descriptions, and become apparent in part from the following descriptions, or be learned through the practice of the present disclosure.

BRIEF DESCRIPTION OF THE DRAWINGS

These and other aspects and advantages of embodiments of the present disclosure will become apparent and readily appreciated from the following descriptions made with reference to the drawings, wherein.

DETAILED DESCRIPTION

Embodiments of the present disclosure are described in detail below. The embodiments described with reference to the drawings are exemplary, and the following describes the embodiments of the present disclosure in detail.

A power system 1 of a vehicle according to the embodiments of the present disclosure is described below with reference to FIGS. 1-6. An all-terrain vehicle includes a vehicle body, and the power system 1 of the vehicle may be mounted in the vehicle body.

Figure 1:
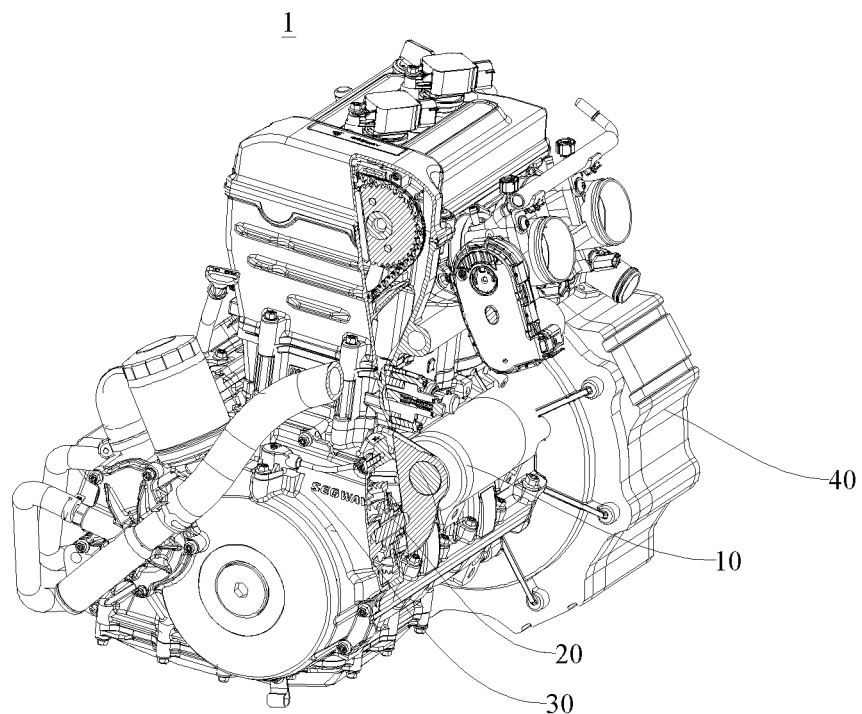
FIG. 1 shows a perspective view of a power system of a vehicle.
Figure 2:
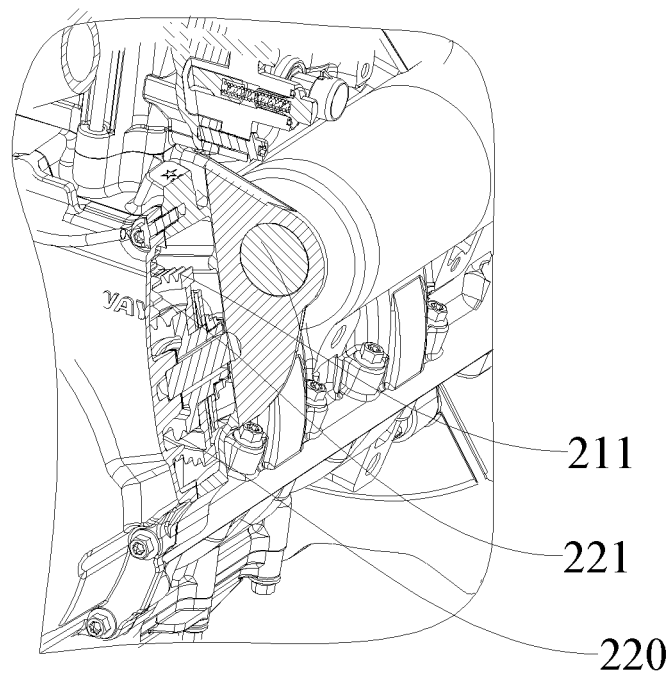
FIG. 2 shows an enlarged view of a part of a transmission device of a power system of a vehicle.
Figure 5:
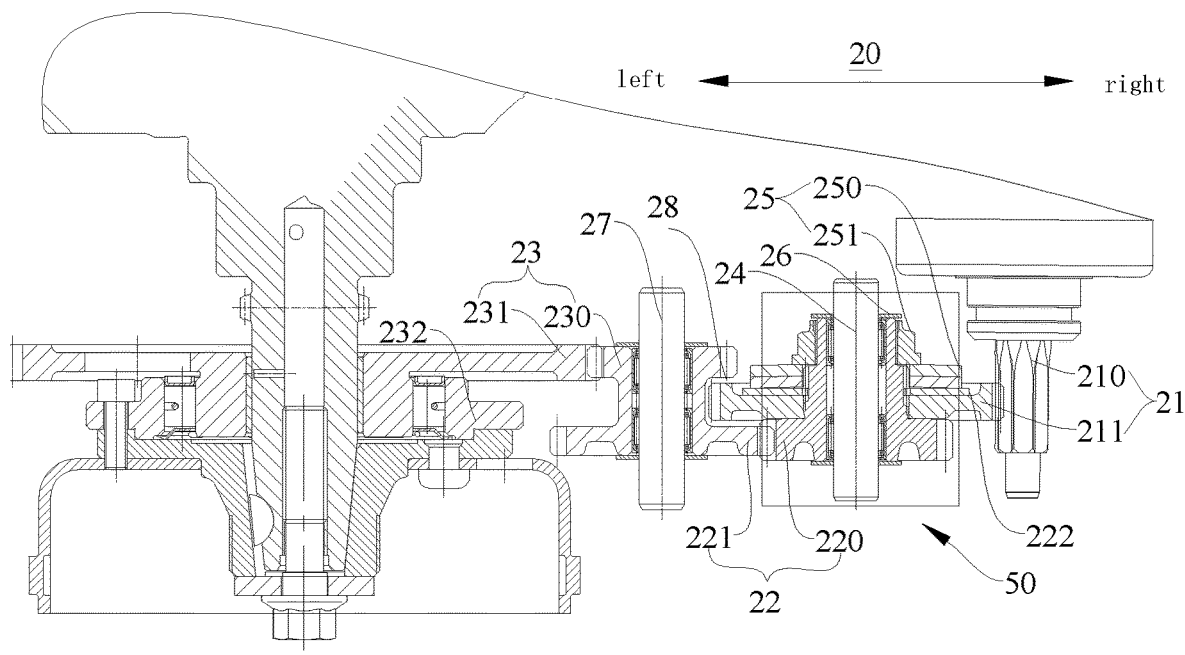
FIG. 5 shows an enlarged view of a part of a transmission device in a section view of the power system of a vehicle.

As illustrated in FIG. 1 and FIG. 5, the power system 1 of the vehicle according to the embodiments of the present disclosure includes a starting motor 10, a transmission device 20 and an engine 30, the transmission device 20 is arranged between the starting motor 10 and the engine 30 to transmit power, and the starting motor 10 is configured for starting the engine 30.

Figure 4:
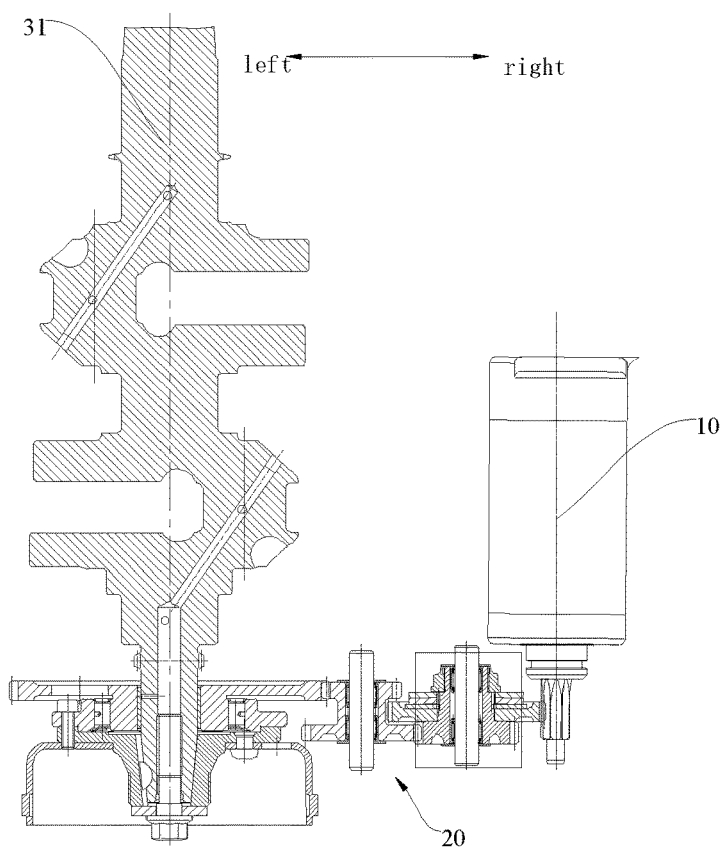
FIG. 4 shows a section view of a power system of a vehicle.

In combination with FIG. 4 and FIG. 5, the transmission device 20 includes a first reduction gear set 21, a second reduction gear set 22 and a third reduction gear set 23, the first reduction gear set 21 is in transmission with the starting motor 10, the second reduction gear set 22 is in transmission between the first reduction gear set 21 and the third reduction gear set 23, and the first reduction gear set 21, the second reduction gear set 22 and the third reduction gear set 23 all include meshed gears. The first reduction gear set 21 realizes first-stage speed reduction transmission, the second reduction gear set 22 realizes second-stage speed reduction transmission, and the third reduction gear set 23 realizes third-stage speed reduction transmission, such that three-stage transmission may be realized between the starting motor 10 and the engine 30.

In combination with FIG. 4 and FIG. 5, the engine 30 includes a crankshaft 31 in transmission with the third reduction gear set 23. Since the first reduction gear set 21, the second reduction gear set 22 and the third reduction gear set 23 all include meshed gears, such that three-stage transmission may be realized between the starting motor 10 and the engine 30, which may replace traditional second-stage transmission. Thus, module of the gears may be increased under the condition that speed ratio is not changed, and strength of the gears in each gear set may also be improved, such that transmission of the transmission device 20 may be more reliable and stable and the transmission effect between the starting motor 10 and the engine 30 may be better.

Thus, the power system 1 of the vehicle adopts three-stage transmission instead of traditional two-stage transmission, the module of the gears may be increased under the condition that the speed ratio is not changed and the strength of the gears may be improved, such that the transmission of the transmission device 20 may be more reliable and stable, and the transmission effect between the starting motor 10 and the engine 30 may be better.

Figure 3:
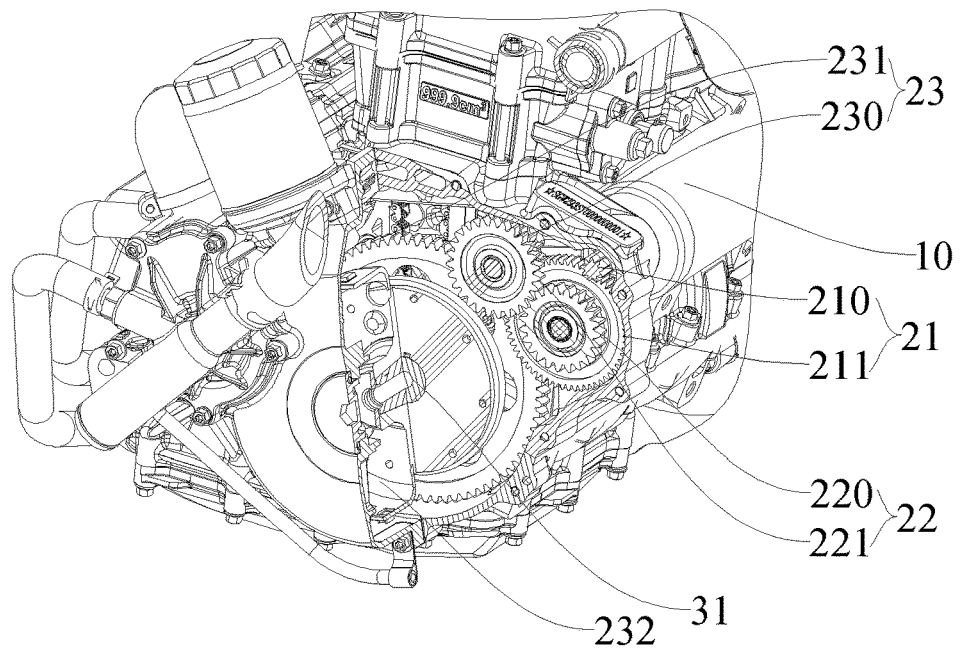
FIG. 3 shows an enlarged view of a part of a power system of a vehicle.
Figure 6:
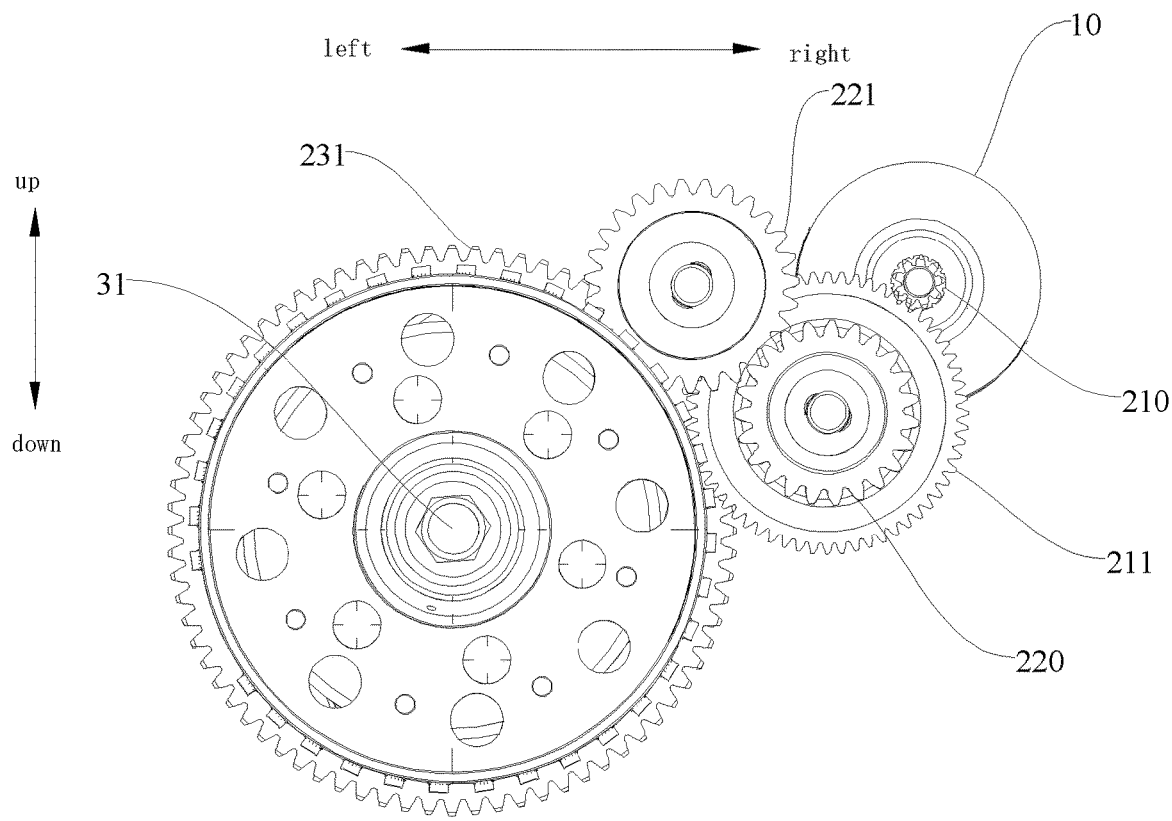
FIG. 6 shows an arrangement diagram of a power system of a vehicle.

According to one embodiment of the present disclosure, as illustrated in FIG. 3, FIG. 5 and FIG. 6, the first reduction gear set 21 includes a first gear 210 and a driving wheel 211 meshed with each other, the first gear 210 is arranged on a motor shaft of the starting motor 10. The second reduction gear set 22 includes a driven wheel 220 and a fourth gear 221 meshed with each other, the driven wheel 220 and the driving wheel 211 are coaxially arranged and in transmission. The third reduction gear set 23 includes a fifth gear 230 and a sixth gear 231 meshed with each other, the fifth gear 230 and the fourth gear 221 are coaxially arranged and in transmission, and the sixth gear 231 is arranged on the crankshaft 31 and is in transmission with the crankshaft 31. In other words, each gear set is provided with two meshed gears, and transmits power successively, and number of teeth and dimension parameters of the two gears meshed with each other are reasonably set, so as to realize speed reduction transmission.

Since the first gear 210 is arranged on the motor shaft of the starting motor 10, and the first gear 210 may be driven to rotate through rotation of the starting motor 10. Since the first gear 210 is meshed with the driving wheel 211, the driving wheel 211 may also rotate; the driven wheel 220 and the driving wheel 211 are coaxially arranged, and the driven wheel 220 may rotate along with rotation of the driving wheel 211; the fourth gear 221 is meshed with the driven wheel 220, and the fourth gear 221 may also rotate; the fifth gear 230 and the fourth gear 221 are coaxially arranged, and the fifth gear 230 may rotate along with rotation of the fourth gear 221; the sixth gear 231 is meshed with the fifth gear 230, and the sixth gear 231 may also rotate; the sixth gear 231 is arranged on the crankshaft 31, such that the crankshaft 31 is driven to rotate. Thus, the three-stage transmission is configured for replacing traditional two-stage transmission, the module of the gears may be increased under the condition that the speed ratio is not changed, the strength of the gears may be increased, such that the overload protection of the engine 30 is improved. The driving wheel 211 is equivalent to a second gear, and the driven wheel 220 is equivalent to a third gear.

Figure 7:
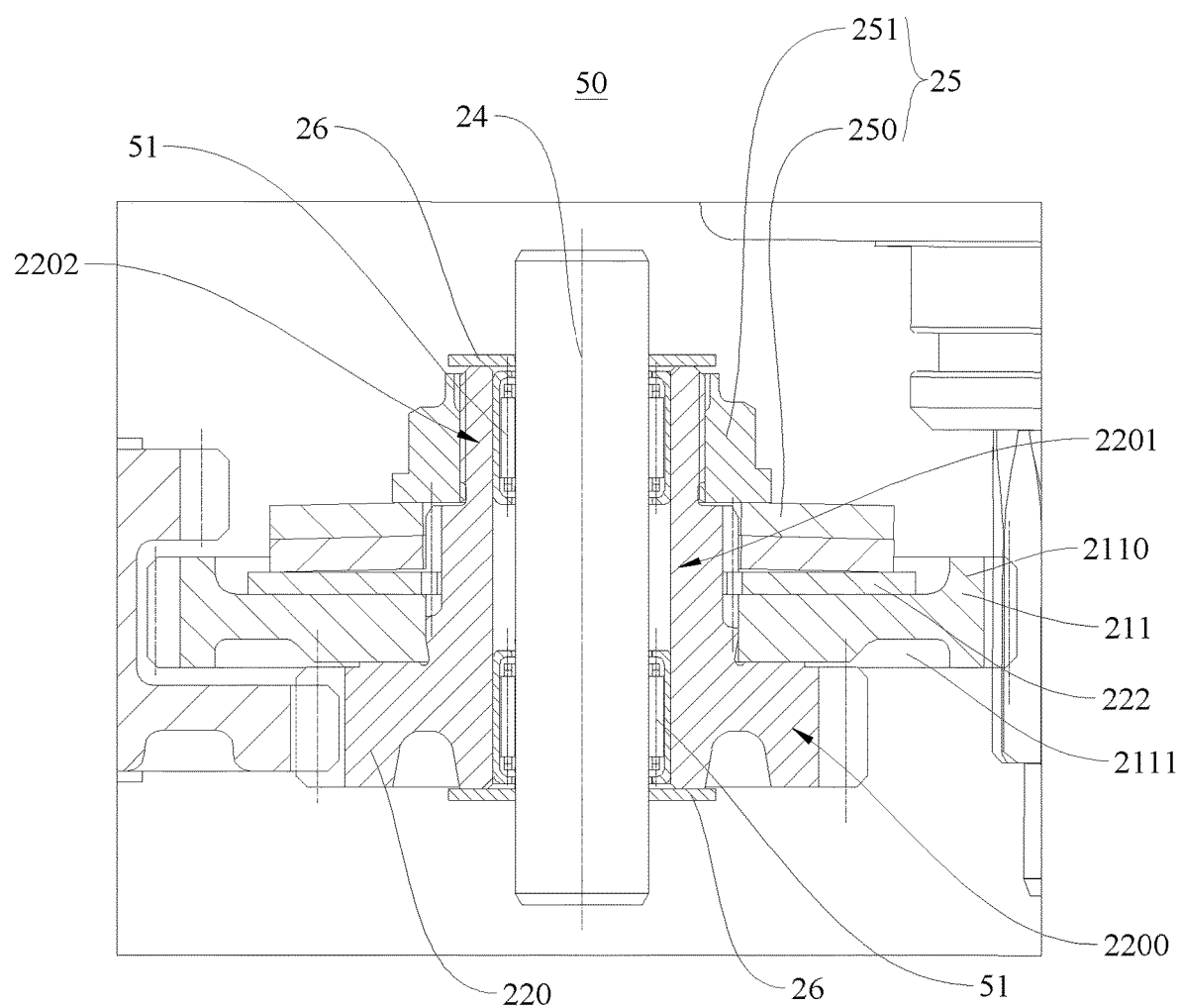
FIG. 7 shows an enlarged view of a starting protector part of a power system of a vehicle.

According to one embodiment of the present disclosure, as illustrated in FIG. 5 and FIG. 7, the all-terrain vehicle further includes a starting protector 50 arranged between the starting motor 10 and the engine 30 and including a shaft 24, the above driven wheel 220, the above driving wheel 211, a friction piece 222 and a compressing assembly 25. The driven wheel 220 is fitted over the shaft 24, the driven wheel 220 is in transmission with the crankshaft 31, and the driving wheel 211 is in transmission with the starting motor 10. The driven wheel 220 and the shaft 24 may be in synchronous rotation or in non-synchronous rotation, and that is, the driven wheel 220 may rotate relative to the shaft 24.

According to one embodiment of the present disclosure, the starting protector 50 is arranged between the first reduction gear set 21 and the second reduction gear set 22.

As illustrated in FIG. 7, the driven wheel 220 includes a tooth portion 2200, a sleeving portion 2201 and a locking portion 2202, the tooth portion 2200 is configured to be connected with the engine 30 and may be configured to be meshed with the fourth gear 221, so as to be connected with the engine 30 and in transmission.

The driving wheel 211 is fitted over the sleeving portion 2201, one side of the driving wheel 211 is attached to the tooth portion 2200, and the driving wheel 211 is configured to be connected with the starting motor 10 and is meshed with the first gear 210, such that the driving wheel 211 may be connected with the starting motor 10 and in transmission through the first gear 210.

As illustrated in FIG. 7, the friction piece 222 is fitted over the sleeving portion 2201, the friction piece 222 and the sleeving portion 2201 are in synchronous rotation, the friction piece 222 is attached to the other side of the driving wheel 211, and the compressing assembly 25 is fitted over the sleeving portion 2201 and the locking portion 2202. The friction piece 222 may achieve a friction transmission effect, and the compressing assembly 25 may achieve a compressing effect.

An overrunning clutch 232 is arranged at an output end of the engine 30, when the overrunning clutch 232 does not work in time and power is transmitted to the sixth gear 231, if the starting torque of the engine 30 exceeds the preset value, the driving wheel 211 and the friction piece 222 slip relatively, and the compressing assembly 25 compresses the friction piece 222 and the driving wheel 211. In other words, the friction piece 222 is fitted over the sleeving portion 2201, the friction piece 222 and the sleeving portion 2201 are in synchronous rotation, and the friction piece 222 is attached to the other side of the driving wheel 211, such that the friction piece 222 and the driven wheel 220 are in synchronous rotation, leading to a better friction effect. In addition, friction force may also be generated between the driving wheel 211 and the driven wheel 220 as well as between the friction piece 222 and the driving wheel 211. Force of the driving wheel 211 is transmitted to the driven wheel 220, the compressing assembly 25 is at least provided with the locking portion 2202, which is mainly to compress the driving wheel 211 and the driven wheel 220, so as to synchronously rotate the driving wheel 211 and the driven wheel 220 when the engine 30 starts, and allow the driving wheel 211 and the driven wheel 220 to slip when starting torque of the engine 30 exceeds a preset value, thereby preventing the starting motor 10 from being damaged.

When the engine 30 starts normally, friction torque between the driving wheel 211 and the driven wheel 220 is limited through compressing force provided by the compressing assembly 25, so as to ensure that the driving wheel 211 and the driven wheel 220 are in synchronous rotation, there is no slippage between the driving wheel 211 and the driven wheel 220, and the starting motor 10 may start the engine through the transmission device 20.

When abnormality occurs in the engine 30, resistance torque of the engine 30 increases, compressing force set by the compressing assembly 25 does not overcome resistance torque of the engine 30, which causes the slippage between the driving wheel 211 and the driven wheel 220 and the engine 30 to fail to start, such that relevant parts and components of the starting motor 10 and the engine 30 are prevented from being damaged due to bearing too large torque.

Therefore, through the arrangement of the friction piece 222 and the compressing assembly 25, the friction force may be generated between the driving wheel 211 and the driven wheel 220 as well as between the friction piece 222 and the driving wheel 211, and the force of the driving wheel 211 is transmitted to the driven wheel 220, such that the driven wheel 220 may rotate along with the driving wheel 211. Moreover, the compressing assembly 25 compresses the driving wheel 211 and the driven wheel 220, so as to synchronously rotate the driving wheel 211 and the driven wheel 220, and allow the driving wheel 211 and the driven wheel 220 to slip when the starting torque of the engine 30 exceeds a preset value, thereby preventing the relevant parts and components of the starting motor 10 and the engine 30 from being damaged due to bearing too large torque.

As illustrated in FIG. 7, the driving wheel 211 includes a tooth ring portion 2110 and a supporting portion 2111 configured for supporting the friction piece 222, an axial dimension of the supporting portion 2111 is smaller than that of the tooth ring portion 2110. An accommodating groove is defined in one side of the tooth ring portion 2110 and the supporting portion 2111 facing the friction piece 222, and the friction piece 222 is contained in the accommodating groove. The arrangement of the accommodating groove in one side facing the friction piece 222 may better contain the friction piece 222 in the accommodating groove, so as to better the friction effects between the driving wheel 211 and the driven wheel 220 as well as between the friction piece 222 and the driving wheel 211, reasonably reduce an axial dimension of the starting protector 50, and further facilitate the reduction of the whole volume of the power system 1.

In some embodiments, as illustrated in FIG. 5 and FIG. 7, the compressing assembly 25 includes an elastic piece 250 and a locking piece 251. The elastic piece 250 elastically abuts against the friction piece 222 and is fitted over the sleeving portion 2201, the locking piece 251 is fitted over the locking portion 2202, and the locking piece 251 and the elastic piece 250 are in abutting cooperation. The sleeving portion 2201 is provided with the elastic piece 250 which has elasticity, when the force of the driving wheel 211 is transmitted to the driven wheel 220, a certain buffering effect may be achieved, such that rigid connection between the driving wheel 211 and the driven wheel 220 are prevented from being damaged during friction. The locking piece 251 may fixedly mount the elastic piece 250 and the friction piece 222 on the sleeving portion 2201 and the locking portion 2202, so as to better the friction effects between the driving wheel 211 and the driven wheel 220 as well as between the friction piece 222 and the driving wheel 211.

The elastic piece 250 is a disk spring, the locking piece 251 is a locking nut, and the locking portion 2202 is provided with an external thread. The elastic piece 250 is the disk spring, and the locking portion 2202 is provided with an external thread. Through cooperation of the locking nut and the external thread, and the elastic piece 250 may be better fixedly mounted on the sleeving portion 2201, such that the force of the driving wheel 211 may be better transmitted to the driven wheel 220.

According to one embodiment of the present disclosure, as illustrated in FIG. 5 and FIG. 7, the shaft 24 is provided with a limiting piece 26 at each of two ends of the driven wheel 220. The limiting pieces 26 are arranged at the two ends of the driven wheel 220, so as to prevent the driving wheel 211 and the driven wheel 220 from shifting when the driving wheel 211 and the driven wheel 220 rotate.

Further, the limiting piece 26 is a retainer ring, the starting protector 50 includes a box body, the shaft 24 is arranged in the box body, and the retainer ring abuts against a side wall of the box body. The limiting piece 26 is the retainer ring which allows for better limiting and protection. The shaft 24 is arranged in the box body, and the retainer ring abuts against the side wall of the box body, such that the friction between the driven wheel 220 and the box body may be reduced, while the retainer ring may better prevent the driving wheel 211 and the driven wheel 220 from shifting, so as to avoid the driven wheel 220 and the box body from being damaged, and prolong the service life of the engine 30.

According to one embodiment of the present disclosure, the friction piece 222 is configured as a gasket and is in spline fit with the sleeving portion 2201. The friction piece 222 is configured as gaskets with small thickness and large friction coefficient, so as to better improve the friction effects between the driving wheel 211 and the driven wheel 220 as well as between the friction piece 222 and the driving wheel 211. There may be a plurality of gaskets in successively stacked arrangement, and the friction piece 222 and the sleeving portion 2201 are in spline fit. Thus, the cooperation of the friction piece 222 and the sleeving portion 2201 may be more stable, such that friction effects between the driving wheel 211 and the driven wheel 220 as well as between the friction piece 222 and the driving wheel 211 may be better.

Besides, as illustrated in FIG. 7, a bearing 51 is arranged between the shaft 24 and the driven wheel 220. The bearing 51 is arranged between the shaft 24 and the driven wheel 220, and a main function of the bearing 51 is to support the driven wheel 220, reduce the friction coefficient of the driven wheel 220 during movement, and be able to ensure a revolving precision of the driven wheel 220.

Further, as illustrated in FIG. 7, two bearings 51 are arranged and correspond to inner sides of the tooth portion 2200 and the locking portion 2202 of the driven wheel 220, respectively. The two bearings 51 are arranged, such that the fitted-over relationship between the shaft 24 and the driven wheel 220 may be more stable. Besides, the two bearings 51 correspond to the inner sides of the tooth portion 2200 and the locking portion 2202 of the driven wheel 220, respectively, and the position arrangement of the bearings 51 is more reasonable, so as to better support the driven wheel 220, and reduce the friction coefficient of the driven wheel 220 during movement. The bearings 51 may be needle roller bearings.

It should be noted that as illustrated in FIG. 7, the tooth portion 2200, the sleeving portion 2201 and the locking portion 2202 are successively connected arrangement in an axial direction, an outer diameter of the tooth portion 2200 is greater than that of the sleeving portion 2201, and an outer diameter of the sleeving portion 2201 is greater than that of the locking portion 2202. The outer diameter of the tooth portion 2200 is greater than that of the sleeving portion 2201, such that the elastic piece 250 and the friction piece 222 may be better arranged at the sleeving portion 2201 and act on the tooth portion 2200 without affecting the normal work of the tooth portion 2200. The outer diameter of the sleeving portion 2201 is greater than that of the locking portion 2202, such that the locking piece 251 may be closer to one side of the axial direction to lock the elastic piece 250 and the friction piece 222, and the fixed mounting effects of the sleeving portion 2201 and the locking portion 2202 may be better.

According to one embodiment of the present disclosure, as illustrated in FIG. 5, the transmission device 20 includes a second shaft 27, and the fourth gear 221 and the fifth gear 230 are duplex gears rotatably arranged on the second shaft 27. The duplex gears are arranged such that space may be better contracted, the structure is compact. Thus, external dimension of the power system 1 is smaller. The shaft 24 is a first shaft.

As illustrated in FIG. 5, an avoiding space 28 is defined on the fourth gear 221 and the fifth gear 230 in an axial direction, and a part of the driving wheel 211 extends into the avoiding space. In other words, the space is reserved between the fourth gear 221 and the fifth gear 230 in the axial direction, such that a part of the driving wheel 211 may extend into the space. Thus, through the arrangement, the space may be better contracted, the structure is compact, and the external dimension of the power system 1 is smaller.

According to one embodiment of the present disclosure, as illustrated in FIG. 5, the overrunning clutch 232 is arranged between the sixth gear 231 and the crankshaft 31. When the sixth gear 231 rotates, the overrunning clutch 232 may transmit power, such that the crankshaft 31 may also rotate along with the sixth gear 231. The overrunning clutch 232 may effectively protect the starting motor 10.

According to one embodiment of the present disclosure, as illustrated in FIG. 6, axes of the driving wheel 211 and the driven wheel 220 are located an axis of the first gear 210 and adjacent to an axis of the sixth gear 231. Axes of the fourth gear 221 and the fifth gear 230 are located obliquely above the axes of the driving wheel 211 and the driven wheel 220 and adjacent to the axis of the sixth gear 231. Through arrangement of the position between the gears, the space may be better contracted, the structure is compact, and the external dimension of the power system 1 is smaller.

According to one embodiment of the present disclosure, as illustrated in FIG. 1, FIG. 4 and FIG. 5, the sixth gear 231 is arranged at one axial end of the crankshaft 31. The power system 1 further includes an electric generator 40 arranged at the other end of the crankshaft 31 and in transmission with the crankshaft 31. Through position arrangement of the sixth gear 231, the crankshaft 31 and the electric generator 40, the space may be better contracted, the structure is compact, and the external dimension of the power system 1 is smaller. The engine 30 may drive the electric generator 40 to generate electricity through the crankshaft 31, the electric generator 40 may output electric power to the motor, and the motor may further transmit power to wheels through the transmission system, such that the vehicle may be driven to travel.

According to one embodiment of the present disclosure, the all-terrain vehicle comprises a vehicle body and the power system 1 of the vehicle of the above embodiments, the power system 1 of the vehicle is mounted in the vehicle body.

In the description of the present disclosure, the first feature being "up", "above" and "on" the second feature may be that the first feature is directly above and obliquely above the second feature, or merely be that the first feature has a level higher than that of the second feature.

Reference throughout this specification to terms "one embodiment", "some embodiments", "exemplary embodiment", "an example", "a specific example", or "some examples", means that a particular feature, structure, material, or characteristic described in connection with the embodiment or example is included in at least one embodiment or example of the present disclosure. In this specification, exemplary descriptions of aforesaid terms are not necessarily referring to the same embodiment or example.

Although embodiments of the present disclosure have been illustrated and described above, it should be understood by those skilled in the art that changes, modifications, alternatives, and variations can be made in the embodiments without departing from spirit, principles and scope of the present disclosure. The scope of this disclosure is limited by the claims and their equivalents.

What is claimed is:

1. A starting protector for an all-terrain vehicle, comprising:
    a shaft,
    a driven wheel fitted over the shaft and comprising a tooth portion, a sleeving portion and a locking portion, and the tooth portion being configured to be connected with an engine;
    a driving wheel fitted over the sleeving portion, one side of the driving wheel being attached to the tooth portion, and the driving wheel being configured to be connected with a starting motor;
    a friction piece fitted over the sleeving portion and being in synchronous rotation with the sleeving portion, the friction piece being attached to the other side of the driving wheel, and when starting torque of the engine exceeds a preset value, the driving wheel and the friction piece slipping relatively; and
    a compressing assembly fitted over the sleeving portion and the locking portion to compress the friction piece and the driving wheel,
    wherein the driven wheel is rotatable relative to the shaft.

2. The starting protector for the all-terrain vehicle according to claim 1, wherein the driving wheel comprises a tooth ring portion and a supporting portion configured to support the friction piece, and an axial dimension of the supporting portion is smaller than an axial dimension of the tooth ring portion.

3. The starting protector for the all-terrain vehicle according to claim 1, wherein the compressing assembly comprises an elastic piece and a locking piece, the elastic piece elastically abuts against the friction piece and is fitted over the sleeving portion, the locking piece is fitted over the locking portion and in abutting cooperation with the elastic piece.

4. The starting protector for the all-terrain vehicle according to claim 3, wherein the elastic piece is a disk spring, the locking piece is a locking nut, and the locking portion is provided with an external thread.

5. The starting protector for the all-terrain vehicle according to claim 1, wherein the shaft is provided with a limiting piece at each of two ends of the driven wheel.

6. The starting protector for the all-terrain vehicle according to claim 5, wherein the limiting piece is retainer ring, the starting protector comprises a box body, the shaft is arranged in the box body, and the retainer ring abuts against a side wall of the box body.

7. The starting protector for the all-terrain vehicle according to claim 1, wherein the friction piece is configured as a gasket and is in spline fit with the sleeving portion.

8. The starting protector for the all-terrain vehicle according to claim 1, wherein two bearings are arranged between the shaft and the driven wheel, and correspond in location to inner sides of the tooth portion and the locking portion of the driven wheel, respectively.

9. The starting protector for the all-terrain vehicle according to claim 1, wherein the tooth portion, the sleeving portion and the locking portion are successively connected in an axial direction, an outer diameter of the tooth portion is greater than an outer diameter of the sleeving portion, and the outer diameter of the sleeving portion is greater than an outer diameter of the locking portion.

10. The starting protector for the all-terrain vehicle according to claim 1, wherein the driven wheel and the shaft is in non-synchronous rotation.

11. An all-terrain vehicle, comprising:
a starting motor;
an engine, wherein the engine comprises a crankshaft; and
a starting protector for the all-terrain vehicle comprising:
  a shaft,
  a driven wheel fitted over the shaft and comprising a tooth portion, a sleeving portion and a locking portion, and the tooth portion being configured to be connected with the engine;
  a driving wheel fitted over the sleeving portion, one side of the driving wheel being attached to the tooth portion, and the driving wheel being configured to be connected with the starting motor;
  a friction piece fitted over the sleeving portion and being in synchronous rotation with the sleeving portion, the friction piece being attached to the other side of the driving wheel, and when starting torque of the engine exceeds a preset value, the driving wheel and the friction piece slipping relatively; and
  a compressing assembly fitted over the sleeving portion and the locking portion to compress the friction piece and the driving wheel;
wherein the starting protector is arranged between the starting motor and the engine, the driven wheel is in transmission with the crankshaft, and the driving wheel is in transmission with the starting motor, and wherein the driven wheel is rotatable relative to the shaft.

12. The all-terrain vehicle according to claim 11, further comprising:
a transmission device arranged between the starting motor and the engine to transmit power; wherein the transmission device comprises a first reduction gear set, a second reduction gear set and a third reduction gear set, the first reduction gear set is in transmission with the starting motor, the second reduction gear set is in transmission between the first reduction gear set and the third reduction gear set, and the first reduction gear set, the second reduction gear set and the third reduction gear set all comprise meshed gears; and
wherein the first reduction gear set comprises a first gear and the driving wheel meshed with each other, the first gear is arranged on a motor shaft of the starting motor, the second reduction gear set comprises the driven wheel and a fourth gear meshed with each other, the driven wheel and the driving wheel are coaxially arranged and in transmission, a third reduction gear set comprises a fifth gear and a sixth gear meshed with each other, and the fifth gear and the fourth gear are coaxially arranged and in transmission.

13. The all-terrain vehicle according to claim 12, wherein the starting protector is arranged between the starting motor and the crankshaft.

14. The all-terrain vehicle according to claim 13, wherein the crankshaft is in transmission with the third reduction gear set; and the sixth gear is arranged on the crankshaft and is in transmission with the crankshaft.

15. The all-terrain vehicle according to claim 14, wherein the transmission device comprises a second shaft, and the fourth gear and the fifth gear are duplex gears rotatably arranged on the second shaft.

16. The all-terrain vehicle according to claim 14, wherein an avoiding space is defined on the fourth gear and the fifth gear in an axial direction, and a part of the driving wheel extends into the avoiding space.

17. The all-terrain vehicle according to claim 14, wherein an overrunning clutch is arranged between the sixth gear and the crankshaft.

18. The all-terrain vehicle according to claim 14, wherein axes of the driving wheel and the driven wheel are offset from an axis of the first gear and adjacent to an axis of the sixth gear; axes of the fourth gear and the fifth gear are parallel and offset from the axes of the driving wheel and the driven wheel and adjacent to the axis of the sixth gear.

19. The all-terrain vehicle according to claim 11, wherein the compressing assembly comprises an elastic piece and a locking piece, the elastic piece elastically abuts against the friction piece and is fitted over the sleeving portion, the locking piece is fitted over the locking portion and in abutting cooperation with the elastic piece.

* * * * *